United States Patent [19]

Cornibert et al.

[11] Patent Number: 4,980,001
[45] Date of Patent: Dec. 25, 1990

[54] APPLYING JACKET MATERIAL TO CORRUGATED METAL SHIELDS OF TELECOMMUNICATIONS CABLE

[75] Inventors: Jacques Cornibert; Jorg-Hein Walling; Rainer A. Minzloff; Marek Kapuscinski; Serge Nadeau, all of Quebec, Canada

[73] Assignee: Northern Telecom Limited, Quebec, Canada

[21] Appl. No.: 435,118

[22] Filed: Nov. 13, 1989

[51] Int. Cl.⁵ .......................................... H01B 13/14
[52] U.S. Cl. ................................ 156/51; 156/244.12; 156/244.21; 156/285; 156/382; 174/102 D; 174/107; 264/102; 264/514
[58] Field of Search ............... 156/51, 285, 286, 382, 156/244.12, 244.21; 174/102 D, 107; 264/101, 102, 514

[56] References Cited

U.S. PATENT DOCUMENTS

| | | | |
|---|---|---|---|
| 3,872,893 | 3/1975 | Roberts | 264/514 X |
| 4,134,953 | 1/1979 | Dembiak et al. | 174/107 X |
| 4,225,749 | 9/1980 | Pierre et al. | 174/107 |
| 4,354,992 | 10/1982 | Bahder | 156/51 X |
| 4,851,165 | 7/1989 | Rennell et al. | 264/514 X |

Primary Examiner—Robert A. Dawson
Attorney, Agent, or Firm—R. J. Austin

[57] ABSTRACT

In a method of applying a jacket to a metal shield of a cable, the jacket comprises a polyolefin having a modifier provided by a carboxylic acid or its anhydride. As the jacket extrudate passes onto the shield, air pressure is lowered at the surface of the shield to provide intimate overall contact between jacket and shield. Heating, additional to that provided by the extrudate, is employed to raise the outside bonding temperature of the shield up to at least the bonding temperature of the modifier so as to provide a bond between the jacket and the shield.

5 Claims, 2 Drawing Sheets

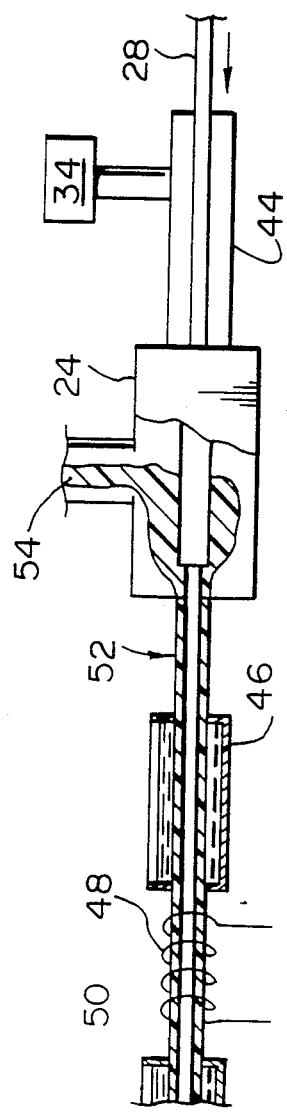
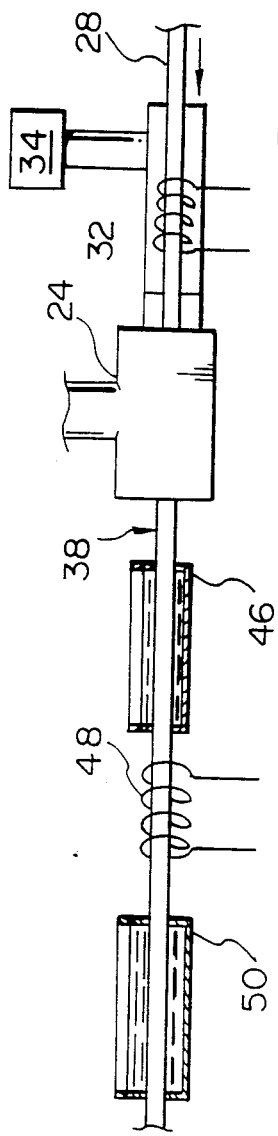

APPLYING JACKET MATERIAL TO CORRUGATED METAL SHIELDS OF TELECOMMUNICATIONS CABLE

BACKGROUND OF THE INVENTION

2. Field of the Invention

This invention relates to the application of a surrounding jacket to a corrugated metal shield in cable manufacture.

2. Description of Prior Art

In the manufacture of telecommunications cable, it is conventional practice to provide a corrugated metal shield, normally steel, around the cable core which comprises a plurality of electrical conductors. In one cable type, a steel shield is tin plated with overlapped longitudinally extending edge regions of the shield bonded together by a soldering operation. To provide a moisture barrier between the shield and a polyolefin cable jacket, a moisture barrier is provided around the shield by a flooding compound before the jacket is extruded onto it. Originally flooding compound was normally asphalt based. However, asphalt flooding compound is brittle under low temperature environmental conditions at −20° C. and this may facilitate crack propagation in the jacket. It tends to embrittle a polyolefin jacket which may then disintegrate at such low temperatures particularly during installation in a manhole when the cable is subjected to twisting, torsional and bending stresses. At high temperatures, asphalt based flooding compounds have presented no particular problem. To overcome the low temperature disadvantage, the asphalt based flooding compounds were replaced by polyisobutylene flooding compounds which do not encourage embrittlement of polyolefin jacket materials. However, at higher temperatures, and within pressurized cables using polyisobutylene flooding compounds, there has been a lack of mechanical integrity in a cable and gas pressures achieved have caused ballooning of the jacket away from the shield if gas penetration occurs through any unsoldered areas at the overlapped edge regions of the shield. In an attempt to prevent such ballooning occurrences, jacket materials were modified to the use of medium density polyethylenes which are also less crack susceptible. However, jackets of medium density material are susceptible to buckling or localized kinking thereby increasing the diameter or width of a cable locally with resultant jamming of cable in ducting through which it is being fed.

The above cable structures using flooding compounds together with their attendant disadvantages were being replaced during the 1970's by another type of cable in which the plating on a steel shield was replaced by a polymeric coat. The polymeric coat was advantageous in that during extrusion of jacket material onto a shield, the polymeric coat was caused to soften and thereby fuse to the jacket material so that a bonding occurred between the shield and the jacket. The heat to activate the bonding was supplied by the jacketing compound itself. The polymeric coating was sufficiently heat insulating to prevent premature solidification of the jacketing compound. This enabled the use of jacketing compounds with very low melt indices,, i.e. in the order of 0.2 to 0.5 g/10 min [as measured by the procedure specified under ASTM D-1238 (condition E)] while such compounds were able to fill completely the corrugations of a metal shield. However, with such a polymeric coat, soldering of the overlapped edges of the shield was impossible and any bonding between the overlapped edges relied upon a softening of the contacting coating layers during extrusion so that the layers became fused together. However, such a bond between overlapped edges of the shield was not very resistant to torsion and bending stresses placed upon a resultant cable whereby shield edge separation could result and the outer edge of the shield could move outwardly and cut through the jacket. This action is normally referred to as "zippering". In an attempt to overcome this problem, plastic filler has been introduced between the overlapped edges of a shield, but this has led to undesirable complications during manufacture.

More recently, polyolefin materials modified with carboxylic acid or anhydride thereof have become available. It has been found that such materials are useful in jackets for cables in that they may bond to a metal (preferably steel) shield without the use of a polymeric coat on the shield. As a result, both a polymeric coast and a flooding compound together with their inherent disadvantages may now be avoided. However, attempts to apply jacketing material employing polyolefin modified with carboxylic acid to metal shields by known extrusion techniques have so far proved to be unsatisfactory. This is because, while the polymeric coat is not required for bonding, the modified polyolefin contacts the metal directly which acts to promote rapid heat transfer from the polyolefin. As a result, the modified polyolefin commences to solidify at its surface too quickly and cannot flow to contact intimately the whole of the corrugated outer surface of the shield. Trapped pockets of air are thus formed at the bases of the corrugations. While bonding has been successful at the positions where the jacketing material actually contacts the surface of the shield, the bonded regions have been weakened by the presence of adjacent non-bonded regions. In such a structure, resultant cracking an disintegration of a jacket could occur upon the application of bending or torsional stresses to the finished cable.

SUMMARY OF THE INVENTION

The present invention provides a process and an apparatus for applying a polyolefin jacket to a metal shield of a telecommunications cable and which seeks to eliminate or minimize the above problem when the polyolefin is modified with a carboxylic acid or anhydride thereof.

According to one aspect of the present invention, there is provided a method of applying a surrounding jacket to a corrugated metal shield covered cable core of insulated electrical conductors comprising: passing the shield covered core along a passline through an extrusion head; passing an extrudate through a flow passage in the head, the extrudate comprising a polyolefin having a modifier provided by a carboxylic acid or anhydride thereof; extruding the extrudate onto the outer surface of the shield at an extrusion station so as to form the jacket while reducing the air pressure on the outside of the shield at the extrusion station to provide a substantially intimate overall area of contact between the jacket and outer surface of the shield; and effecting a bond between the jacket and the outer surface of the shield, throughout the overall area of contact, by the use of heating applied to the shield, additional to that provided by the extrudate, to raise the outside surface temperature of the shield at least to the bonding activation temperature of the modifier.

To achieve a specified adhesion, certain active groups are required. For example, to achieve an adhesion with 15 lbs/inch 'T' pull strength, the active groups in the formulation may need to be in the order of 0.03 which is the ratio of the infrared absorption peak of the unsaturated carboxylic acid or anhydride thereof (the reactive or modifying group) to the infrared absorption peak of $CH_2$ (the polyolefin chain or group). The infrared absorption peak of the unsaturated carboxylic acid or anhydride thereof is 1790 cm-1 while the infrared absorption peak of $CH_2$ is 720 cm$^{-1}$.

With the inventive method, air pressure reduction is required to achieve a substantial intimate overall area of contact between the jacket and the outer surface of the shield as it encourages the extrudate to flow easily into contact with the shield. Air pockets are thus avoided. This overall area of contact of course includes unbroken contact between jacket and shield into the bases of the corrugations.

Preferably, the jacket is cooled after extrusion sufficiently to cool its surrounding radially outer regions to effect radial shrinkage of the jacket and cause it to apply radial pressure upon the outside surface of the shield. The additional heating is then provided at a heating station by use of an induction heater and the bond between jacket and shield is effected during the application of the radial pressure.

Alternatively, a heating station is provided upstream along the passline from the extrusion station and the shield covered core is heated as it passes through the extrusion station. In this alternative case, the additional heat coacts with the air pressure reduction to provide a substantially intimate overall bonded contact between the extrudate and shield.

Without the use of preheat and with the additional heating provided after a cooling step, the extrudate must have a sufficiently high melt index, to allow it to flow under vacuum conditions and fill the corrugations. The melt index figure is dependent at least partly upon the dimensions of the corrugations. For instance, in certain cases a melt index as low as 0.7 g/10 min may suffice, but values above this are also envisaged. In any other case, and using preheat, the melt index may be slightly lower.

For temperature control purposes and to ensure the required temperature, it is essential to have any upstream heating station as close as possible to the extrusion station without the interpositioning of a vacuum connection between these two stations. Such an interpositioning of the vacuum connection could uncontrollably remove the applied heat and make temperature control difficult, because this would encourage outside and cooler air to rush through the heating station and over the corrugations. With the vacuum applied upstream from the heating station, however, the gas pressure is still reduced at the extrusion station while having no undesirable effect upon the heating step and upon the temperature control.

In a further alternative process within the scope of the invention, there are two heating stations, both with their own heaters, the stations disposed one at a position upstream of the extrusion station and the other downstream from a position in which the jacket has been cooled after extrusion sufficiently to cool its surrounding radial outer regions to effect radial shrinkage of the jacket and cause it to apply radial pressure upon the outside surface of the shield.

In all cases, heating is preferably performed by induction heating. This should be at such a frequency to ensure that only the radially outer regions of the shield are heated. If the shield is the only shield provided, heat at the inner surface of the shield should be avoided because this may deleteriously affect conductor insulation in the cable core. Alternatively, if the shield is of steel and surrounds an aluminum shield for electrical conductivity purposes longitudinally of the cable, it is normal for such an aluminum shield to provide a longitudinal gap of about 0.5 inches between its edges. If the frequency of the inductive heater is too low the induced currents will penetrate through the steel into the aluminum. As a result, the current will pass solely along the narrow longitudinal region of the steel overlying the gap in the aluminum shield. This will overheat the steel shield. It has been found that an induction heater operating at a frequency typically 450 kHz or higher will heat the outer regions of the steel shield as is required to avoid the above disadvantages.

In a preferred process, the shield comprises a corrosion resistant metal coating which bonds together, by soldering overlapped longitudinally extending edge regions of the shield. The heat applied to the shield covered core raises the temperature of the coating to a temperature below its melting point. The corrosion resistant metal coating may be for instance tin, copper coated onto the shield by electrolytic means, or zinc.

The invention, according to a further aspect, also provides apparatus for applying and bonding a surrounding jacket to a corrugated metal shield covered cable core of insulated electrical conductors, the jacket comprising a polyolefin having a modifier provided by a carboxylic and/or anhydride thereof, the apparatus comprising: an extrusion head located at an extrusion station and surrounding a passline for the shield covered cable core; a heating means surrounding the passline at a heating station for heating the outer surface of the shield as it moves along the passline to raise the outside surface temperature of the shield at least to the bonding activation temperature of the modifier; and an air pressure reducing means for creating a reduction in air pressure on the outside of the shield at the extrusion station from an applied position upstream along the passline from the extrusion station.

The apparatus according to the invention is preferably provided with a jacket cooling means disposed downstream along the passline from the extrusion station and with the heating means at the heating station downstream from the cooling means for inductively heating the outer surface of the shield to supply the additional heat.

Alternatively, heating means is disposed at the heating station disposed upstream from the extrusion station and the air pressure reducing means operates the air pressure reduction from an applied position upstream along the passline from the heating station. Conveniently the heating means is disposed upstream from the extrusion head itself. This arrangement enables an extrusion head of conventional design to be used.

The invention further include, according to another aspect, an electrical cable comprising a cable core of insulated electrical conductors, a corrugated metal shield surrounding the core, and a jacket surrounding the metal shield, the jacket comprising a polyolefin having a modifier provided by a carboxylic acid or anhydride thereof and the jacket lying in intimate overall contact with an outer surface of shield and being bonded by the modifier throughout the overall contact areas to the outer surface of the shield.

BRIEF DESCRIPTION OF THE DRAWINGS

One embodiment of the present invention will now be described, by way of example, with reference to the accompanying drawings, in which:

FIGS. 4 and 5 are views similar to FIG. 2 of second and third embodiments.

DESCRIPTION OF THE PREFERRED EMBODIMENT

Figure 1:
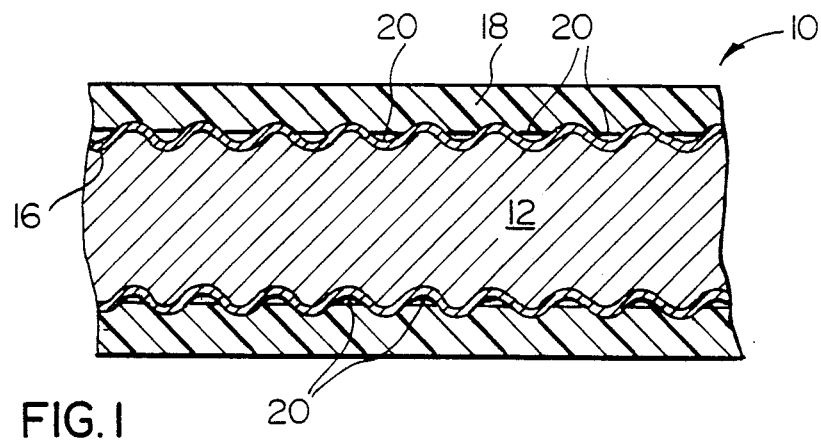
FIG. 1 is a cross-sectional view through part of a cable structure having a jacket of a polyethylene modified with a carboxylic acid or anhydride thereof, the structure having been made by a conventional cable making process.

As can be seen from FIG. 1, a telecommunications cable 10 made by a conventional cable making process comprises a core 12 formed of a plurality of pairs of individually insulated conductors (not shown), the core being surrounded by a core wrap (not shown) around which is disposed a steel shield 16 of corrugated form. The steel shield was precoated with a tin based soldering material and overlapped edges (not shown) of the shield are soldered together longitudinally of the cable to provide a continuous water impenetrable seam. Surrounding the shield 16 is a jacket layer 18 formed from a polyethylene composition which is modified with a carboxylic acid or anhydride thereof. The polyethylene composition has a density of 0.925 g/cm$^3$ and a melt index of about 0.9 g/10 min as measured by the procedure specified under ASTM D-1238, (condition E). The melt index proVided complete filling of corrugations as will be described, for a corrugation pitch of 0.1 inches and a depth of 45 mil. The carboxylic acid is either maleic acid or acrylic acid with any suitable content of the total content of the jacket material for providing the required adherence of the jacket to the shield. More specifically, in the embodiment, the acid is present by volume up to a total of approximately 2% of the total volume of the jacket.

The jacket 18 was extruded onto the shield 16 by conventional processes, that is to say, that after location of the shield around the core and soldering the overlapped edges of the shield together, the shield covered core, untreated in any additional fashion, was fed directly through an extrusion head 11. As a result, it was found that the extrudate had a reluctance to move across the total outside surface area of the corrugations so that air pockets 20, particularly at the bases of the corrugations, were formed. As a result of the formation of the air pockets 20 in the construction of FIG. 1, while the jacket material adhered adequately to the shield 16 in the various regions where intimate contact was achieved, finished cable was completely unsatisfactory because of the reduction in total adherence between jacket and shield. For instance, while local contacting and bonded regions between jacket and shield provided substantial localized strength, overall torsion, bending and peeling strength was weakened by the randomly positioned air pockets. In addition to this, cracking and disintegration of the jacket could result upon the application of torsional or bending stresses to the cable. Further, the air pockets 20 provided an assistance for moisture seepage along the outside of the shield 16 after any moisture access was created through the jacket.

The embodiments to be described avoid a construction such as described above with reference to FIG. 1 together with the substantial elimination of all the disadvantages inherent in such a construction.

Figure 2:
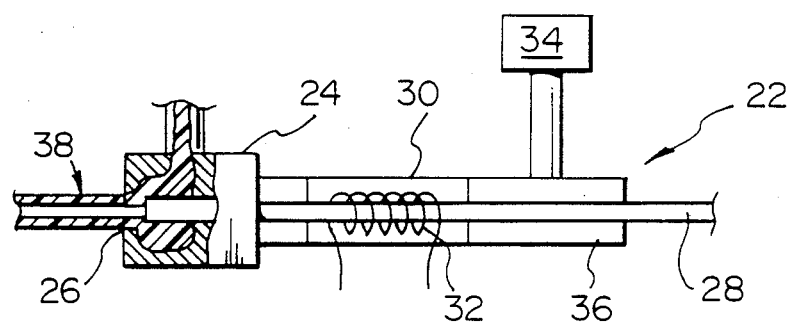
FIG. 2 is a diagrammatical side elevational view partly in section of an apparatus according to a first embodiment for applying a surrounding jacket to a corrugated metal shield covered cable core.

As can be seen from FIG. 2, in the first embodiment, an apparatus 22 is provided for applying a jacket to a corrugated metal shield covered cable core of insulated electrical conductors. In the apparatus 22 of FIG. 2, an extrusion head 24 of conventional design has an extrusion orifice 26 surrounding a passline for a shield surrounded cable core 28 as it moves downstream through the extrusion head. The extrusion orifice 26 is provided at an extrusion station. Within the extrusion head is disposed a core tube 29 for guiding the core 28 towards and through the orifice 26. Directly upstream from the extrusion head is disposed a heating means 30 which comprises an induction heater 32 formed by a plurality of turns of wire surrounding and extending partly along the passline for the shield covered core 28. The induction heater operates at at least 450 kHz and for this purpose heaters are available from Pillar Industries, Lepel or Westinghouse. To provide adequate control for the temperature at the outside of the shield upon reaching the extrusion station, it is desirable that the heating means 30, is disposed in a heating station as closely as possible to the extrusion head. In practice, a distance of around 12 inches has been found to be desirable between the downstream end of the heater 32 and the upstream end of the head.

The apparatus is also provided with a gas pressure reducing means for creating a reduction in gas pressure on the outside of the shield at the extrusion station. The gas pressure reducing means comprises a vacuum creating source 34 which is connected into a chamber 36, surrounding the passline of the shield covered core at a position upstream from the heating means 30, so as to be effective for reducing the air pressure below atmospheric conditions between the extrusion orifice 26 and the chamber 36. It has been found that with the vacuum source 34 applied at such an upstream position, it does not interfere with the control of the heating means 30 in raising the temperature of the outside of the shield to that required. The apparatus has a conventional water cooling trough (not shown) downstream from the extrusion head.

Figure 3:
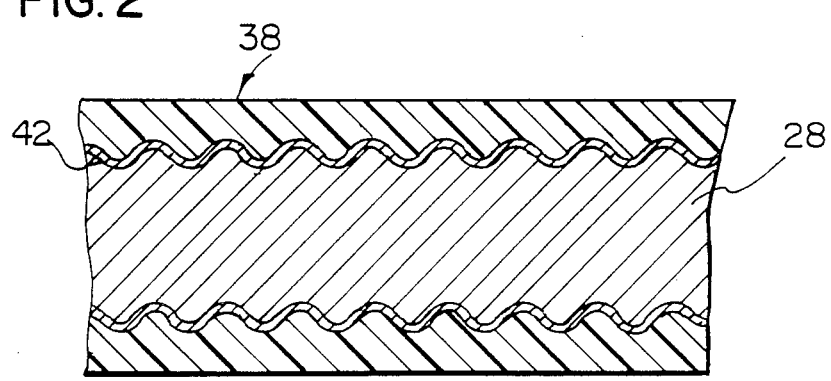
FIG. 3 is a view similar to FIG. 1 of part of a cable having similar jacket material to the structure of FIG. 1 and in which the jacket has been applied by the apparatus of FIG. 2.

The apparatus shown in FIG. 2 is used for applying the jacket upon the shield covered core 28 to form a telecommunications cable 38 shown on the left-hand side of FIG. 2 and in greater detail in FIG. 3. The cable of FIG. 3 has a core wrap (not shown) and a corrugated steel shield 42 formed of the same materials and of the structure of the cable of FIG. 1. While the shield 42 of the cable 38 is coated with a tin based solder material, in this particular structure, the solder material has a softening temperature above the melting point of the jacket material which is the same polyethylene modified with carboxylic acid or anhydride thereof as described with reference to FIG. 1 and has a melt index between 0.25 g/10 min and 0.5 g/10 min as measured by the procedure specified under ASTM D-1238 (condition E). The composition may be made by taking a batch of carboxylic acid modified polyethylene and mixing it with unmodified polyethylene so as to provide a mixture having a total volumetric content of maleic acid in the region referred to above, i.e. up to about 2% by volume of the total volume of the composition. The tin based solder may for instance, be chosen from any one of the four following compositions in Table I parts taken by weight):

TABLE I

| Composition | Sn % | Sb % | Ag % | Pb % | Softening Point | Melting Point |
|---|---|---|---|---|---|---|
| 1 | 95 | 5 | | | 232 | 238 |
| 2 | 96 | | 4 | | | 221 |
| 3 | 95 | | 5 | | 221 | 240 |
| 4 | 10 | | | 90 | 224 | 302 |
| 5 | 10 | 10 | | 80 | 245 | 246 |

On the other hand, the jacket material has a melting temperature around 200° C.

To apply the jacket material to the shield covered core 28, the core is fed, as shown in FIG. 2, through the chamber 36 to which the pressure reducing source 34 is applied. The shield covered core 28 then proceeds through the heating means 30 and out through the extrusion orifice 26 with the whole area enclosed from the chamber 36 to the extrusion orifice, so that along this length of the feedpath there is a reduction in air pressure upon the outside of the shield. The heating means 30 operates to heat the shield to an outside temperature below the melting point of the solder and also to maintain that temperature below the melting point of the solder but at least to the bonding activation temperature of the modifier when the shield reaches the extrusion station 26. This is above the melt temperature of the extrudate. It has been found that the control of the heating step is not significantly undesirably affected by the application of the vacuum at the upstream position. Upon the extrudate contacting the outside surface of the shield 42, air pressure reduction draws the extrudate down into the corrugations to achieve a substantial intimate overall area of contact between the extrudate and the shield, i.e. into the bases of the corrugations. This action is assisted by the high surface temperature of the shield which maintains the extrudate in a molten condition thereby encouraging it to flow completely along the total surface of the shield and down into the corrugations. As a result, the corrugations of the shield become filled with the extrudate, as can be seen from FIG. 3. As the shield surface temperature is above the bond activation temperature of the modifier upon contact of the extrudate with the shield, overall intimate bonding contact between the jacket material and the metal of the shield occurs so as to provide substantial and adequate torsion, bending and peel strength of the bonded joint. It follows that no air pockets are created in the structure such as were seen with the construction of FIG. 1 above, and moisture seepage between the jacket and the shield 42 is thereby not encouraged. Achievement of the desired strength requirements ensures that upon the application of bending or torsional forces to the cable, e.g. during cable laying or subsequently when in use, the jacket does not separate from the shield so that cracking and disintegration of the jacket does not result.

As may be seen therefore, the apparatus and process described in the embodiment provide a cable having a jacket of a material which, while normally being reluctant to flow into corrugations of a metal shield, nevertheless lies in intimate bonding engagement with the whole outer corrugated surface of the shield.

In second and third embodiments now to be described, apparatus having parts similar to those described in the first embodiment will bear like reference numerals.

In a second embodiment as shown in FIG. 4, the extrusion head 24 is connected directly to the vacuum creating source 34 by a passage 44 so as to exclude the effects of outside air. In this particular embodiment, no heater is provided upstream from the extrusion head as described in the first embodiment. Instead, immediately following the extrusion head there is disposed a water cooling trough 46 of, conventional structure for effecting a partial cooling of the jacket so as to solidify its outer regions only. This cooling trough 46 is followed downstream along the feedpath by a heater 48 of similar construction to the heater 32 described in the first embodiment. Immediately downstream from the heater 48 is disposed a second cooling trough 50.

In use of this embodiment, a shield covered core 28 is moved along a passline through the vacuum tube 44, extrusion head 24, cooling trough 46, heater 48 and cooling trough 50. This core 28 is of similar construction to the core 28 described with reference to the first embodiment. Upon the core reaching the extrusion orifice 26 it is contacted by the extrudate 54 issuing from the extrusion head. The reduction in air pressure directly at the surface of the shield at the extrusion orifice as the extrudate moves into contact with it, desirably draws the extrudate into intimate contact with the shield. However, because there is no heating provided upstream from the extrusion head which is used to assist in the drawing-down of the extrudate into intimate engagement with the corrugated outer surface of the shield, then the melt index of the extrudate is needed to be higher to encourage its flow to achieve the desired intimate engagement. It is envisaged that a melt index above 0.7 g/10 min is required and in this particular embodiment, the extrudate has a melt index of approximately 1.6 g/10 min. The corrugations of the shield have the same pitch and depth dimensions as in the first embodiment. The cable 52 provided by the core surrounded by the extruded jacket then passes from the extrusion head and into the first cooling trough 46, the length of which taken together with other parameters such as line speed and temperature of the extrudate, ensure that upon issue of the cable from the cooling trough 46, the outer surfaces of the jacket are solidifying and are shrinking so as to apply a radial inward pressure at the interface between jacket and sheath. The cable 52 then passes through the induction heater 48 with the jacket at the interfacial regions with the sheath still in a molten condition. The induction heater 48 induces heat through the jacket and into the shield so as to raise the temperature of the outer surface regions of the shield above the bond activation temperature of the modifier in the extrudate. This raise in temperature creates a bond at the interface between jacket and sheath and the achievement of this bond is assisted by the inward pressure of the jacket material caused by the shrinking of the solidified matter. Thus, a partial cooling of the jacket assists in a positive fashion in helping the bond between the two materials. The cable 52 then proceeds through the cooling trough 50 so as to completely cool the jacket. The finished structure of the cable is similar to that shown in FIG. 3.

In a third embodiment as shown in FIG. 5, a combination of the first and second embodiments is used. As can be seen, the apparatus of FIG. 5 incorporates an extrusion head 24 with the upstream heater 32 and the vacuum device 34 further upstream from the heater. Downstream from the extrusion head, the apparatus includes the cooling troughs 46 and 50 and the heater 48 interposed between them.

With the use of the apparatus of the third embodiment, a shield covered core 28 is passed along the passline to be preheated before reaching the extrusion orifice. As described in the first embodiment the preheat applied to the outer surface of the shield assists in encouraging the extrudate to move into intimate contact with the surface of the shield while also creating a bond between the two materials. The cable 52 formed of the jacket covered core then moves down to the cooling trough 46 during which the surface of the jacket is solidified as described in the second embodiment so as to apply inward pressure to the bonded interface between jacket and shield. As the cable moves through the induction heater 48, the temperature of the shield is again raised above the bond activation temperature of the modifier in the extrudate and the bonding action is again initiated so as to increase the bond between jacket and shield. The cable then proceeds through the cooling trough 50 so as to completely cool the product.

What is claimed is:

1. A method of applying a surrounding jacket to a corrugated metal shield covered cable core of insulated electrical conductors comprising:
    passing the shield covered core along a passline through an extrusion head;
    passing an extrudate through a flow passage in the head, the extrudate comprising a polyolefin having a modifier provided by a carboxylic acid or anhydride thereof;
    extruding the extrudate onto the outer surface of the shield at an extrusion station so as to form the jacket while reducing the air pressure on the outside of the shield at the extrusion station to provide a substantially intimate overall area of contact between the jacket and the outer surface of the shield;
    and effecting a bond between the jacket and the outer surface of the shield, throughout the overall contact areas, by the use of heating applied to the shield additional to that provided by the extrudate, to raise the outside surface temperature of the shield at least to the bonding activation temperature of the modifier.

2. A method according to claim 1 wherein the extrudate has a melt index of above 0.7 g/10 min as measured by the procedure specified under ASTM D-1238 (condition E) and the method comprises cooling surrounding radially outer regions of the jacket downstream from the extrusion station, to effect radial shrinkage of the jacket and cause it to apply radial pressure upon the outside surface of the shield, then, at a heating station, inductively heating the outside surface of the shield to supply the additional heat, and bonding the jacket to the outer surface of the shield during the application of the radial pressure by the jacket to the shield.

3. A method according to claim 1 comprising passing the shield covered core through a heating station to heat the outer surface of the shield to supply the additional heat and then passing the core covered with the heated shield through the extrusion head and extruding the extrudate onto the heated outer surface of the shield, the extrudate having a melt index of at least 0.25 g/10 min as measured by the procedure specified under ASTM D-1238 (condition E), with the reduction in gas pressure being created at the extrusion station from a position upstream along the passline from the heating station, the additional heating coacting with the air pressure reduction to provide a substantially intimate overall bonded contact between the extrudate and shield.

4. A method according to claim 3 comprising downstream from the extrusion station cooling surrounding outer regions of the jacket to effect radial shrinkage of the jacket and cause it to apply radial pressure upon the outside surface of the shield, then inductively heating the outer surface of the shield to supply further additional heat to raise the temperature of the outer surface of the shield again at least to the bonding activation temperature of the modifier and then, by the use of the further additional heat consolidating the bond between the jacket and the outer surface of the shield.

5. A method according to claim 1 wherein the shield also comprises a corrosion resistant metal coating which bonds together overlapped longitudinally extending edge regions of the shield, and the heat applied to the shield covered core raises the temperature of the coating to a temperature below its melting point.

* * * * *